March 27, 1928.  W. F. H. BRAUN  1,663,900
LAWN MOWER
Filed Dec. 24, 1926  3 Sheets-Sheet 3
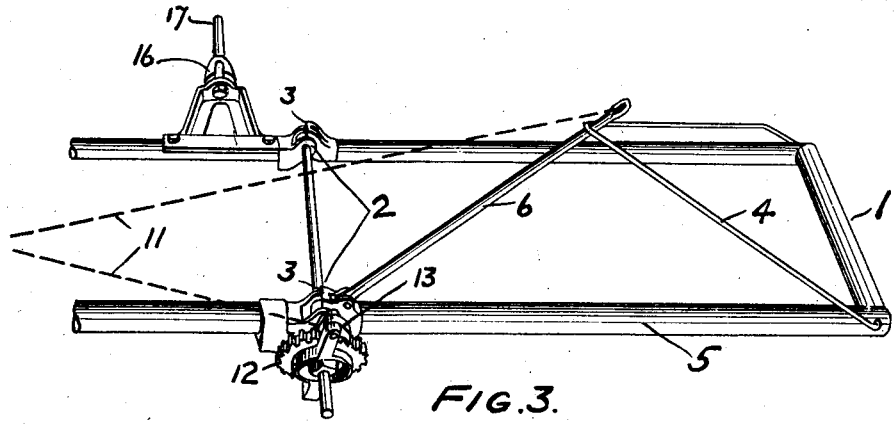
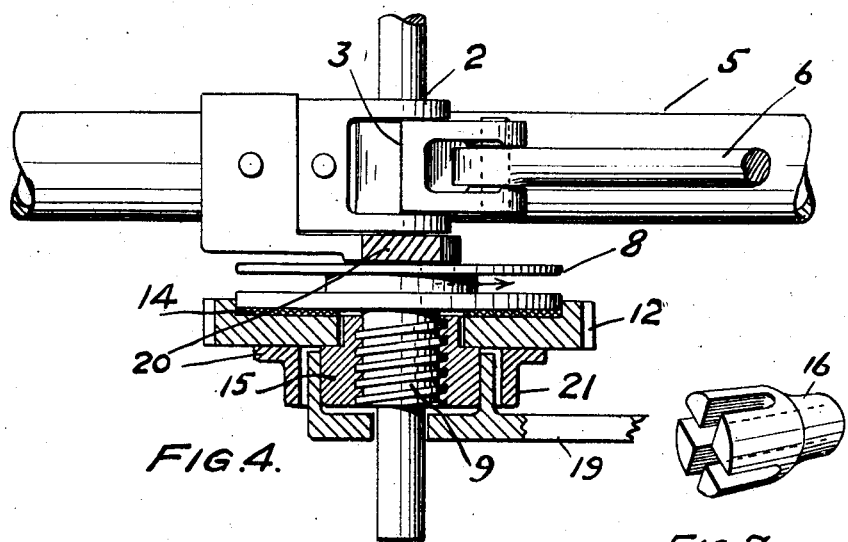
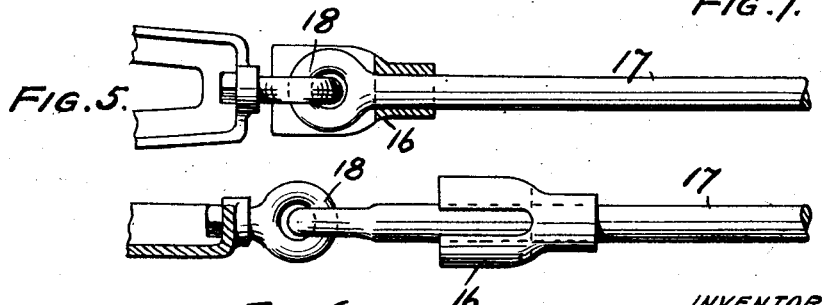
WITNESS:
INVENTOR
William F. H. Braun
BY
Augustus B. Stoughton
ATTORNEY.

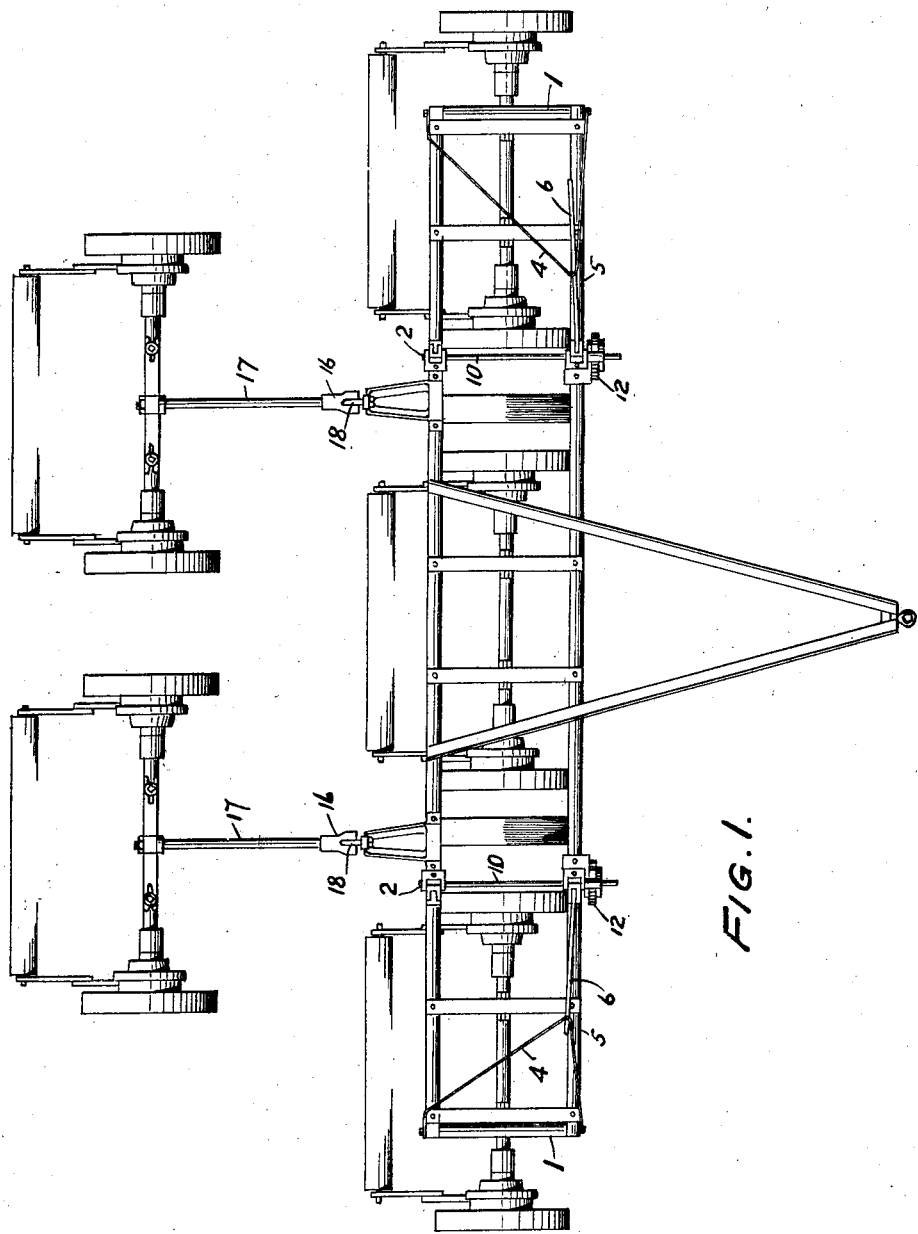

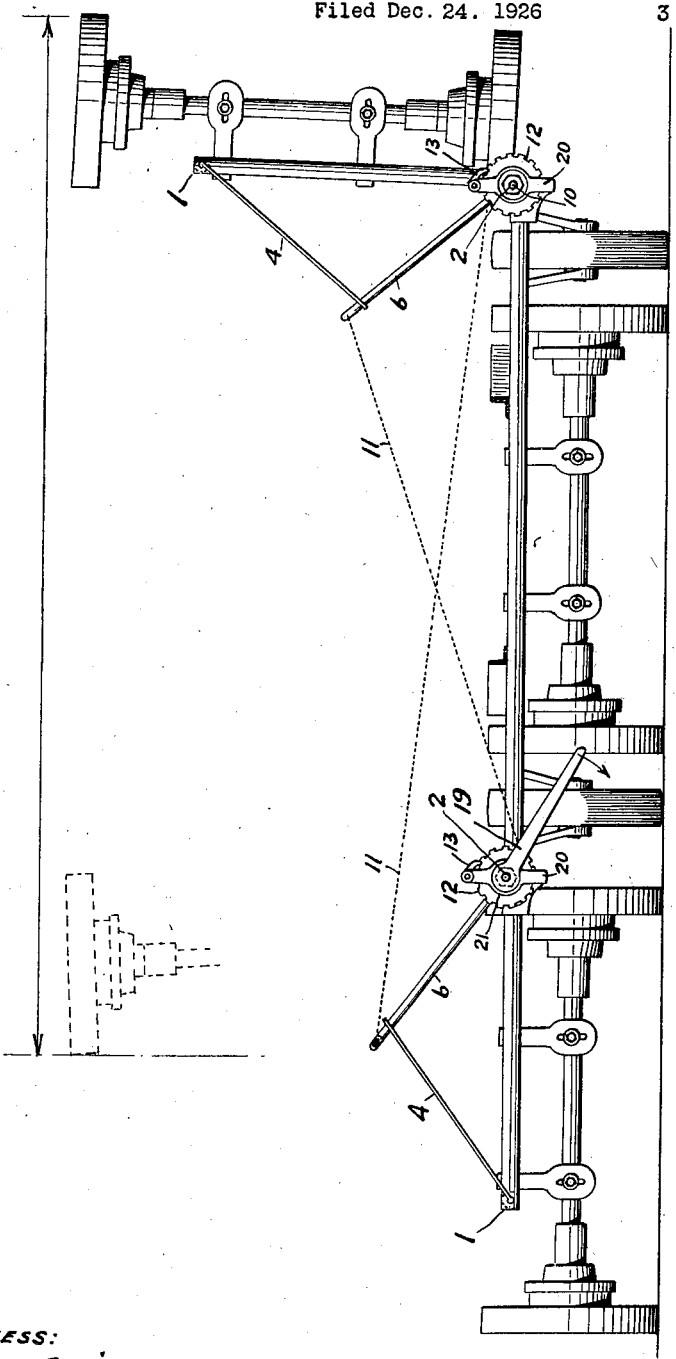

Patented Mar. 27, 1928.

1,663,900

UNITED STATES PATENT OFFICE.

WILLIAM F. H. BRAUN, OF WYNNEWOOD, PENNSYLVANIA, ASSIGNOR TO PENNSYLVANIA LAWN MOWER WORKS, OF PHILADELPHIA, PENNSYLVANIA, A CORPORATION OF PENNSYLVANIA.

LAWN MOWER.

Application filed December 24, 1926. Serial No. 156,829.

The present invention relates to lawn mowers and more particularly to so-called gang lawn mowers in which a number of mower units are interconnected by means of a frame or equivalent device.

In order to facilitate the entrance and exit of gang lawn mowers into and out of barns or other housing structures it is customary to pivotally support the end sections and to raise them for entrance and exit and to lower them for use.

The principal objects of the present invention are to facilitate the operation of housing such lawn mowers and of arranging them for use; to improve the means for raising and lowering the free ends of the pivotal sections of lawn mowers; and to lower the free end of the pivotal section of the lawn mower, which is comparatively heavy, easily and gently without shocks or jars and with little or no exertion on the part of the operator.

Other objects of the invention will appear from the following description and the invention, generally stated, may be said to comprise means for raising and lowering the free end of a pivotal section of a lawn mower which include a winding drum having a threaded hub, connections between the pivotal section and drum whereby the former exerts unidirectional torque on the latter, a ratchet wheel free to turn in winding direction only and arranged for facial contact with the drum, and a nut on the hub adapted when turned in winding direction to clamp the drum onto the wheel against said torque, and when turned in the other direction to back off and permit the drum to turn in unwinding direction under said torque and to screw into the nut and clamp itself to the ratchet wheel.

The invention also comprises the improvements to be presently described and finally claimed.

In the following description reference will be made to the accompanying drawings forming part hereof and in which Figure 1 is a top or plan view of a gang lawn mower embodying features of the invention.

Fig. 2 is an elevational view of the same illustrating different positions of the ends of the pivotal sections.

Fig. 3 is a perspective view illustrating upon an enlarged scale means for raising and lowering the pivotal sections.

Fig. 4 is a top or plan view partly in section illustrating the means shown in Fig. 3 to an enlarged scale.

Figs. 5 and 6 are respectively top and side views partly in section drawn to an enlarged scale and illustrating features shown at the top in Fig. 1, and Fig. 7 is a perspective view of one of the parts shown in Figs. 5 and 6.

In the drawings a section at each side of the lawn mower is pivotally mounted and since the sections are duplicates as are also the means by which the ends of the sections are raised and lowered, the description will be given in the singular. The section 1 of the lawn mower is pivotally mounted as at 2, and the free end of the pivotal section is raised to facilitate entrance and exit into a barn and is lowered for use. As shown the pivot 2 is provided with a foot or knuckle 3 for limiting the range of turning movement of the section 1. The section 1 is provided with a bail 4 of generally triangular shape so that it can fold down upon one of the bars 5 of the frame. There is a lifting arm 6 pivotally connected with the member 3 and which projects through the bail, and when this arm 6 is turned counterclockwise in Fig. 3, it works through the bail and lifts the section 1, and when the lifting arm 6 is turned clockwise in Fig. 3, it rests upon the bar 5, as does also the bail 4. The parts are shown in the last described position in Fig. 1. 8 is a revoluble winding drum having a threaded hub 9, Fig. 4, and it is shown as mounted on a shaft 10. There are connections by which the weight of the section 1 exerts unidirectional torque on the drum in unwinding direction. As shown these connections comprise a cable 11 connected with the end of the lifting arm 6 at one side of the machine and with the winding drum at the opposite side of the machine, and the cables are wound on the drums in appropriate direction. 12 is a ratchet wheel free to turn in winding direction only. The detent 13, Fig. 3, prevents turning in the other direction. The ratchet wheel 12 is arranged for facial contact with the drum and as shown friction material 14 is interposed between them. 15 is a nut on the hub, and it is adapted when turned in winding direction to clamp the drum 8 onto the wheel 12 against the torque on the drum and when turned in the other direction to back off and permit the drum to turn in unwinding direction under the torque and to screw into the nut and clamp itself to the ratchet wheel thus checking its further motion.

For backing into and out of a barn or otherwise use may be made of keepers 16 slidably mounted on the tongues 17 of the trailing mower units, and these keepers are provided with crosswise ranging notches that when in engagement with the eyes of the swivel 18, Fig. 5, render the latter ineffective. When the keeper 16 is in the position shown in Fig. 6, the swivel is free.

The mode of operation may be described as follows:

To lift the free end of the lefthand section 1 in a wrench 19 is applied to the nut 15, Fig. 3, and turned clockwise against the torque on the winding drum 8, so that the nut screws onto the hub and binds the ratchet wheel 12 and drum together so that they turn clockwise winding on the cable 11 which appertains to the lefthand section, thus the lifting arm at the lefthand side in Fig. 1 is lifted raising the section 1 at that side. The pawl 13 permits rotation of the ratchet wheel 12 in the direction indicated. To lower the section 1 at the left in Fig. 2, the wrench 19 is turned in counterclockwise direction with the result that the nut is backed off a little releasing the pressure between the wheel 12, now held stationary by the pawl 13, and the drum 8, which under the pull or torque of the cable, turns counterclockwise lowering the section 1 at the left but in thus turning the drum screws its hub into the nut again establishing braking pressure between the wheel 12 and the drum 14, so that the latter turns slowly and lowers the section 1 gently and under the control of the wrench 19, upon which little or no exertion need be expended.

It may be remarked that 20 is a frame or bracket by which the pawl 13 is suspended and it may be provided with a lip 21 which provides a housing for the nut.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. In a gang mower having a pivotal section, means for raising and lowering the free end of the pivotal section which comprise a revoluble drum having a threaded hub and mounted on the mower, connections between the section and drum whereby the former exerts unidirectional torque on the latter in unwinding direction, a ratchet wheel mounted on the mower and free to turn in winding direction only, and a nut on the hub adapted when turned in winding direction to clamp the drum onto the wheel against the torque on the drum and when turned in unwinding direction to back off and permit the drum to turn in unwinding direction under the torque and to screw into the nut and clamp the ratchet wheel with a braking action.

2. In a gang mower having a pivotal section, means for raising and lowering the free end of the pivotal section which comprise a revoluble drum having a threaded hub and mounted on the mower, a pivotal lifting arm adapted to lift the free end of the section, a cable from the arm to the drum and adapted to exert torque on the latter in unwinding direction, a ratchet wheel mounted on the mower and free to turn in winding direction only, and a nut on the hub adapted when turned in winding direction to clamp the drum onto the wheel against the torque on the drum and when turned in unwinding direction under the torque and the screw into the nut and clamp the ratchet wheel with a braking action.

3. In a gang mower having a pivotal section, means for raising and lowering the free end of the pivotal section which comprise a revoluble drum having a threaded hub and mounted on the mower, a pivotal bail on the free end of the section, a pivoted arm arranged through said bail, a cable from the arm to the drum and adapted to exert torque on the latter in unwinding direction, a ratchet wheel mounted on the mower and free to turn in winding direction only, and a nut on the hub adapted when turned in winding direction to clamp the drum onto the wheel against the torque on the drum and when turned in unwinding direction to back off and permit the drum to turn in unwinding direction under the torque and to screw into the nut and clamp the ratchet wheel with a braking action.

4. In a gang mower having a pivotal section, means for raising and lowering the free end of the pivotal section which comprise a revoluble drum having a threaded hub and mounted on the mower, a pivotal lifting arm adapted to lift the free end of the section, a limit stop for the turning movement of the section, a cable from the arm to the drum and adapted to exert torque on the latter in unwinding direction, a ratchet wheel concentric with the drum and free to turn in winding direction only, and a nut on the hub adapted when turned in winding direction to clamp the drum onto the wheel against the torque on the drum and when turned in unwinding direction to back off and permit the drum to turn in unwinding direction under the torque and to screw into the nut and clamp the ratchet wheel with a braking action.

WILLIAM F. H. BRAUN.